United States Patent [19]

Zerlaut et al.

[11] 4,031,385

[45] June 21, 1977

[54] SOLAR TRACKING DEVICE

[75] Inventors: Gene A. Zerlaut, Phoenix; Robert F. Heiskell, Glendale, both of Ariz.

[73] Assignee: Desert Sunshine Exposure Tests, Inc., Phoenix, Ariz.

[22] Filed: Apr. 5, 1976

[21] Appl. No.: 673,484

[52] U.S. Cl. .................. 250/203 R; 126/270; 356/152

[51] Int. Cl.² .................. G01J 1/20

[58] Field of Search .......... 250/201, 203, 208, 209, 250/578; 356/141, 152; 126/270, 271

[56] References Cited

UNITED STATES PATENTS

| | | | |
|---|---|---|---|
| 3,023,661 | 3/1962 | McClusky et al. | 250/203 R |
| 3,917,942 | 11/1975 | McCay | 126/270 |
| 3,931,515 | 1/1976 | Parkin | 356/152 |

*Primary Examiner*—David C. Nelms
*Attorney, Agent, or Firm*—Cahill, Sutton & Thomas

[57] ABSTRACT

A solar tracking system is disclosed, utilizing a photovoltaic device, for following the changing solar position. When the sun ceases to be the brightest object in the sky, such as during periods of partial cloud cover, and the system seeks to acquire the brightest spot in preference to the sun, the photovoltaic device is automatically overridden. The override system is clock-driven and moves the tracking system to approximate the solar position so that the sun can be immediately reacquired by the photovoltaic device when the sun re-energizes as the brightest object in the sky.

6 Claims, 1 Drawing Figure

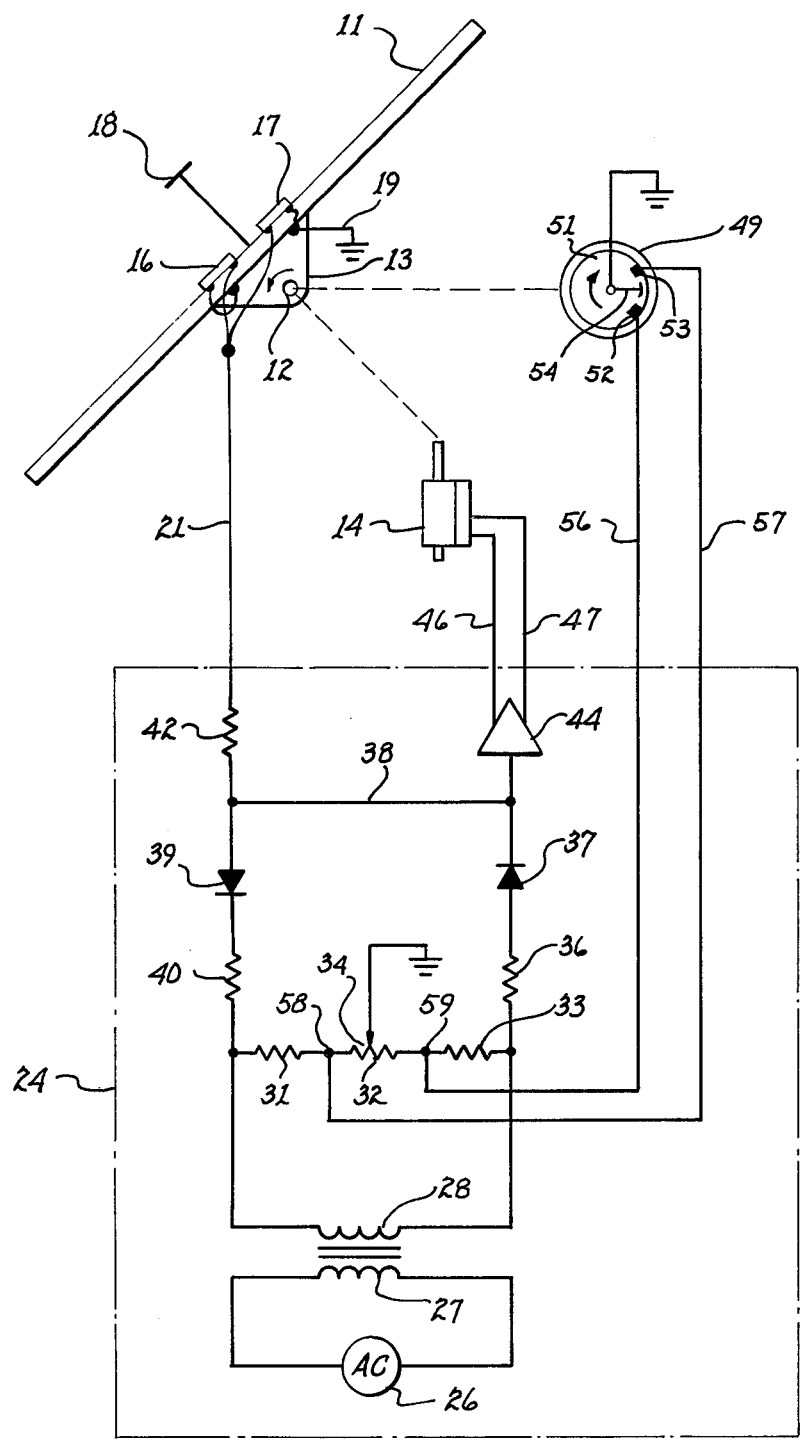

400

SOLAR TRACKING DEVICE

BACKGROUND OF THE INVENTION

This invention relates to solar tracking devices, and more particularly, to such devices employing feedback controlled tracking mechanisms.

DISCUSSION OF THE PRIOR ART

Solar energy devices, such as solar concentrators, work most efficiently when they are oriented perpendicular to the solar position. Since the position of the sun is continually changing, to maintain these devices perpendicular to the solar position it is necessary to selectively alter the orientation of the devices. Devices that track the solar position and control the orientation of solar energy devices fall into two general categories.

The first category utilizes matched solar cells or other photovoltaic devices which are shaded to provide a differential signal whenever the controlled apparatus is not oriented perpendicular to the solar position. Utilizing a feedback mechanism, these devices respond to the differential signal produced to move the controlled apparatus until it is oriented perpendicular to the solar position. Such devices are subject to a significant limitation which becomes particularly apparent when broken cloud cover is present. Photovoltaic devices are unable to discriminate between the sun and any other bright object appearing in the sky. As a result, when broken cloud cover is present, it is possible for a cloud to appear brighter than the cloud-obscured sun. The feedback mechanism will acquire the bright cloud and follow its position rather than tracking the solar position.

A second category of tracking devices utilizes clock mechanisms to control the orientation of the controlled apparatus. To compensate for the compound movement of the sun, daily from horizon to horizon, and seasonally with a progressing seasonal elevation, these clock mechanisms must be elaborate and therefore expensive. Such clock mechanisms frequently must be capable of handling the significant torque forces required to move the controlled apparatus.

It is therefore an object of the present invention to provide solar tracking which discriminates between the location of the brightest object in the sky and the approximate solar position.

It is also an object of the present invention to track the brightest object in the sky until the location of the brightest object deviates from the approximate solar position and to thereupon track the approximate solar position.

It is another object of the present invention to provide clock responsive solar tracking without utilizing precision mechanisms.

It is yet another object of the present invention to provide clock responsive solar tracking without utilizing high torque capacity mechanisms.

It is a further object of the present invention to provide solar tracking that combines photovoltaic controls and clock responsive controls.

SUMMARY OF THE INVENTION

Method and apparatus are disclosed for tracking the solar position regardless of sky conditions. Orientation of the tracking equipment is normally controlled by a photovoltaic device. However, when sky conditions obscure the sun and create a false target for the photovoltaic device which induces the equipment to track away from the approximate solar position, a clock responsive override system assumes control of the equipment. The override system causes the equipment to track the approximate solar position until the sun reemerges as the target for the photovoltaic device and the override system relinquishes control of the equipment orientation.

BRIEF DESCRIPTION OF THE DRAWING

The drawing shows a schematic view of a tracking system constructed in accordance with the teachings of the present invention.

DETAILED DESCRIPTION OF THE ILLUSTRATIVE EMBODIMENT

A solar device 11 (which may be a mounting platform for supporting samples to be exposed to the sun) is shown in the drawing mounted to a frame 13 which is rotated about a pivot 12 by a reversible motor 14. As the dashed lines on the drawing indicate, motor 14 is mechanically linked to frame 13 so that motor 14 can selectively orient device 11 in rotational relationship to pivot 12. Since device 11 operates most efficiently when it is orientated perpendicular to the solar position, it is desirable to automatically track the changing solar position to control motor 14 and hence the orientation of device 11.

Primary control for the orientation of device 11 is provided by a pair of matched solar cells 16 and 17 which are shaded by a shade 18. In the conventional manner, the outputs from cells 16 and 17 connect to that one terminal of each cell is grounded, being strapped to a chassis ground 19 as shown in the drawing, for example, and the other terminal of each cell interconnects to a differential signal lead 21. Differential signal lead 21 combines the output voltages such that no net voltage appears on lead 21 when equal solar radiation falls on cells 16 and 17. This condition would obtain when device 11 is oriented perpendicular to the solar position. If the orientation of device 11 were altered relative to the solar position, shade 18 would screen some of the incoming solar radiation from either cell 16 or cell 17. Resultingly, the outputs of cells 16 and 17 would be unequal since the amount of solar radiation received by the cells would be unequal. When cell 16 receives more solar radiation than cell 17, a positive net voltage appears on lead 21 while a negative net voltage appears when cell 17 receives the greater radiation. The differential signal on lead 21 is the primary input to orientation control circuit 24 which controls the operation of motor 14.

Control circuit 24 includes an AC power source 26 connected across a primary transformer winding 27. Winding 27 is inductively coupled to a secondary winding 28. A resistance network comprising resistor 31, potentiometer 32 and resistor 33 is connected across winding 28. By adjusting the grounded tap connection 34 of potentiometer 32, the resistance network can be balanced, as is well known. Also connected across winding 28, and in parallel with the resistance network, is a directional loop beginning at winding 28 and extending through a resistor 36, diode 37, conductor 38, diode 39, resistor 40 and back to winding 28. Diodes 37 and 39 are conductive only when current flows counterclockwise in the directional loop.

Differential signal lead 21 is the primary input to circuit 24 and connects through a series resistor 42 to conductor 38. Conductor 38 also connects to a servo amplifier 44, which generates the output control signal from circuit 24. Servo amplifier 44 is a well known device for energizing either of two outputs, in this application clockwise control lead 46 and counterclockwise control lead 47, depending upon the polarity of the input signal applied to amplifier 44.

In its normal mode of operation, circuit 24 controls motor 14 in response to the differential signals appearing on lead 21. If device 11 is not oriented perpendicular to the solar position, shade 18 will cause unequal solar radiation to be received by cells 16 and 17, producing a signal on lead 21. The polarity of winding 28 alternates in response to the AC signal in winding 27. As a result, diodes 37 and 39 both are alternately conductive and non-conductive. When diodes 37 and 39 are conductive, current flows in the directional loop including winding 28 causing the current supplied to the input of amplifier 44 to be essentially zero. However, when the polarity of winding 28 reverses, diodes 37 and 39 become non-conducting and no current flows in the directional loop. Now, the signal applied to amplifier 44 is the differential signal on lead 21 connected via conductor 38. Thus, the input to amplifier 44 is a signal approximating a square wave having an amplitude and polarity corresponding to the differential signal on lead 21 and a frequency equal to the frequency of AC source 26.

Depending upon the polarity of the signal on lead 21, either lead 46 or lead 47 will be activated by amplifier 44 to control the operation of motor 14 which moves device 11 around pivot 12 until the device is properly oriented perpendicular to the solar position. When device 11 is properly oriented, no signal appears on lead 21 and neither output lead 46 or 47 of amplifier 44 is activated.

So long as clear sky conditions prevail, the orientation of device 11 would be controlled as described above. However, a false target may occur when broken cloud cover is presented. While one cloud obscures the sun, another cloud may appear as the brightest object in the sky. Cells 16 and 17 would not distinguish between the sun and the bright cloud. Accordingly, they would produce a signal on lead 21 that would attempt to track the bright cloud. Since the bright cloud's position may not coincide with the solar position, an override system is provided to prevent device 11 from being oriented substantially away from the approximate solar position.

The override system includes a clock responsive contact unit 49 which is mechanically connected to frame 13 of device 11 as indicated in the drawing. Unit 49 includes movable plate 51 having a pair of contacts 52 and 53 connected thereto. A conventional 24-hour clock mechanism (not shown) causes plate 51, and contacts 52 and 53, to rotate clockwise relative to unit 49 as indicated by the arrow on the drawing. Contacts 52 and 53 connect via leads 56 and 57, respectively, to point 58, located between resistor 31 and potentiometer 32, and point 59, located between potentiometer 32 and resistor 33. Leads 56 and 57 are the secondary inputs to circuit 24 and control the override provision. Unit 49 also includes a pendulum contact 54 which connect to ground and remains vertical regardless of the orientation of unit 49.

In normal operation, device 11 tracks the solar position such that frame 13 rotates counterclockwise about pivot 12 as indicated by the arrow in the drawing. So long as device 11 remains oriented substantially perpendicular to the solar position, the clockwise rotation of plate 51 will offset the counterclockwise rotation of unit 49, which connects to frame 13 of device 11, and the relative position of contacts 52 and 53 relative to pendulum contact 54 will remain unchanged. However, if a false target is acquired by cells 16 and 17 and an attempt made to track away from the approximate solar position, represented by the clock responsive position of plate 51, pendulum contact 54 will come into contact with either contact 52 or 53, depending on the direction of the misorientation of device 11. Thus, ground potential is connected through pendulum contact 54 to either contact 52 or 53 to be applied respectively via lead 56 to point 59 or via lead 57 to point 58. The resistance network is now unbalanced by the grounding of either point 58 or 59. Without regard to the low level differential signal applied by cells 16 and 17 to lead 21, a voltage of high signal level will be impressed on conductor 38 due to the imbalance in the resistance network. The impressed voltage will provide the input to amplifier 44 to control the operation of motor 14 to orient device 11. When motor 14 re-orients device 11 perpendicular to the approximate solar position, contact with pendulum contact 44 is broken, removing ground from point 58 or 59 and returning circuit 24 to its normal operating mode.

Because device 11 remains oriented to the approximate solar position even if the sun is obscured by cloud cover, cells 16 and 17 immediately reacquire the sun when it re-emerges.

The schematic representation shown in the drawing illustrates a system effective to control the orientation of a solar device about a single axis, for example, an east-to-west traverse. Where a more sophisticated tracking system is required, the tracking system shown in the drawing could be duplicated to provide similar control relative to a second axis. If the second axis is oriented perpendicular to the first axis, a tracking system that compensates for variations in solar elevation is provided.

Although contact 54 is indicated as being gravitationally positioned, it could be fixed in position, such as being connected to the fixed position framework supporting pivot 12. Also, the paired contacts 52 and 53 could be replaced by a single movable contact and pendulum contact 54 could be paired to provide forward-backward control of motor 14. Contacts 52 and 53 could also be replaced by "contactless contacts" or proximity devices in which a fixed and movable contact produces a first electrical or magnetic signal when they are in proximity to each other, and a second signal when they are moved relative to each other.

Various modifications of the illustrative embodiment would be made by those skilled in the art without departing from the spirit and scope of the present invention. For example, although the electrical control system of the illustrative embodiment has been described as being responsive to voltage variations, the control system could as readily be made responsive to variations in phase of the electrical signals being monitored.

What is claimed is:

1. A method for controlling the orientation of a device to track the changing location of the sun in the sky, said method comprising the steps of:

a. producing electrical signals corresponding to the position of the device relative to the brightest spot in the sky;
b. positioning the device in response to the electrical signals to orient the device perpendicular to the brightest spot in the sky;
c. overriding the positioning of the device in response to the electrical signals whenever the position of the brightest spot in the sky deviates more than a predetermined amount from the position of the sun in the sky;
d. generating clock responsive electrical signals representing the approximate position of the sun in the sky; and
e. locating the device in response to the clock responsive electrical signals whenever the positioning of the device is overridden, thereby orienting the device approximately perpendicular to the position of the sun in the sky.

2. Apparatus for controlling the orientation of a device to track the changing location of the sun in the sky, said apparatus comprising, in combination:
a. means for producing electrical signals corresponding to the position of the device relative to the brightest spot in the sky;
b. orientation means for positioning the device in response to the electrical signals to orient the device perpendicular to the brightest spot in the sky;
c. means for overriding said orientation means whenever the position of the brightest spot in the sky deviates more than a predetermined amount from the position of the sun in the sky;
d. means for generating clock responsive signals representing the approximate position of the sun in the sky; and
e. means for locating the device in response to the clock responsive signals whenever said orientation means are overridden, thereby orienting the device approximately perpendicular to the position of the sun in the sky.

3. Apparatus for tracking the solar position, said apparatus comprising, in combination:
a. a solar device having a surface for exposure to solar radiation;
b. a servo control mechanism controlled by electrical signals for selectively orienting said solar device to position said surface approximately perpendicular to the brightest spot in the sky;
c. photovoltaic means for generating said electrical signals in response to solar radiation;
d. means connecting said electrical signals to said servo control mechanism;
e. a clock mechanism for tracking an approximate solar position; and
f. override means responsive to said clock mechanism for overriding said photovoltaic device when the brightest object in the sky is not located at the approximate solar position and for thereupon producing override signals which control said servo control mechanism to orient said solar device perpendicular to the approximate solar position.

4. Apparatus in accordance with claim 3 wherein said override means includes
a. at least one movable contact connected to said solar device and movable relative to said solar device under control of said clock mechanism to maintain said movable contact at a fixed normal position by compensating for the changing orientation of said solar device under control of said servo control mechanism; and
b. at least one fixed contact responsive to movement of said movable contact away from said fixed normal position for producing said override signals.

5. Apparatus in accordance with claim 3 wherein said override means includes
a. a pair of spaced apart contacts connected to said solar device and movable relative to said solar device under control of said clock mechanism to maintain said spaced apart contacts at a fixed normal position by compensating for the changing orientation of said solar device under control of said servo control mechanism; and
b. a fixed contact positioned between said spaced apart contacts and responsive to movement of said spaced apart contacts away from said fixed normal position for producing a first override signal to control the orientation of said solar device in one direction when said fixed contact makes contact with a first one of said spaced apart contacts and for producing a second override signal to control the orientation of said solar device in another direction when said fixed contact makes contact with the other one of said spaced apart contacts.

6. Solar tracking apparatus of the type having a solar device; a servo control mechanism for selectively rotating said solar device about an axis; and a photovoltaic device to control said servo control mechanism for orienting said solar device perpendicular to the brightest object in the sky, wherein the improvement comprises:
a clock actuated mechanism for tracking the approximate solar position, for overriding said photovoltaic device when the brightest object in the sky is not located at the approximate solar position and for controlling said servo control mechanism to orient said solar device perpendicular to the approximate solar position whenever said photovoltaic device is overridden.

* * * * *